United States Patent
Takeuchi et al.

(10) Patent No.: US 7,252,439 B2
(45) Date of Patent: Aug. 7, 2007

(54) BLADE-TYPE OPTICAL TRANSMISSION APPARATUS

(75) Inventors: Osamu Takeuchi, Kawasaki (JP); Hirotaka Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 10/849,192

(22) Filed: May 20, 2004

(65) Prior Publication Data
US 2005/0168962 A1 Aug. 4, 2005

(30) Foreign Application Priority Data
Feb. 3, 2004 (JP) ............................ 2004-027104

(51) Int. Cl.
*G02B 6/36* (2006.01)
(52) U.S. Cl. ............................. 385/89; 385/88; 385/92; 385/31; 385/39; 398/164; 361/788; 361/796
(58) Field of Classification Search ................. 385/89; 398/164; 361/788
See application file for complete search history.

(56) References Cited
U.S. PATENT DOCUMENTS 5,983,294 A * 11/1999 Kim et al. .................... 710/62
6,623,177 B1 * 9/2003 Chilton ......................... 385/88
6,693,901 B1 * 2/2004 Byers et al. ................. 370/362
6,804,248 B1 * 10/2004 Tomar et al. ................ 370/401
2002/0089996 A1 * 7/2002 Komatsu et al. ............ 370/442
2004/0042448 A1 * 3/2004 Lebizay et al. ............. 370/362
2004/0109408 A1 * 6/2004 Mesh et al. ................. 370/222

FOREIGN PATENT DOCUMENTS

JP 8-181663 7/1996
JP 9-005580 1/1997

* cited by examiner

Primary Examiner—Frank G. Font
Assistant Examiner—Ryan Lepisto
(74) Attorney, Agent, or Firm—Staas & Halsey LLP

(57) ABSTRACT

A blade-type optical transmission apparatus includes a plurality of main-signal blades, each of which is provided with an external optical signal interface unit, a cross-connect unit, and an internal optical signal interface unit, a blade enclosure in which the plurality of main-signal blades are enclosed, and a back plane which is situated inside the blade enclosure and provides a ring connection for the internal optical signal interface unit between the main-signal blades.

7 Claims, 21 Drawing Sheets

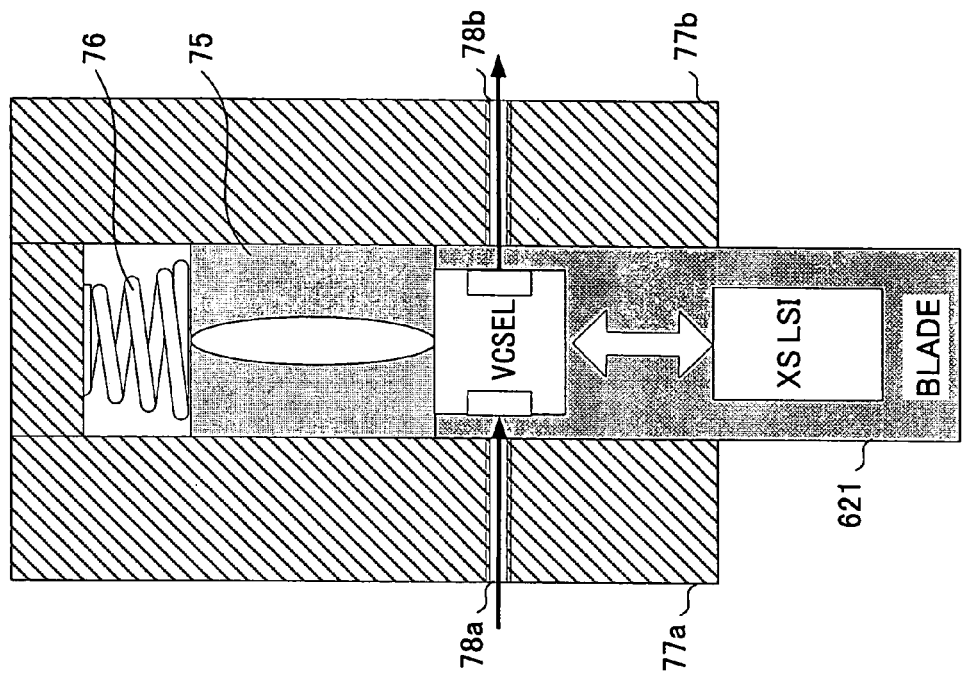
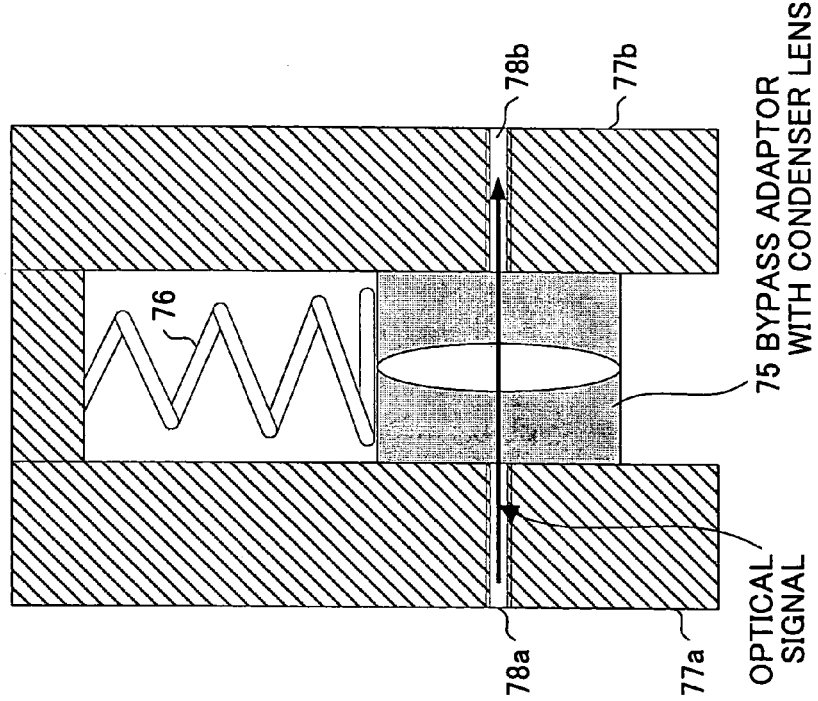

SONET BLADE (8ch OC3 I/F)  SONET BLADE (4ch OC12 I/F)  SONET BLADE (OC48 I/F)

8ch OC3 I/F  2ch OC12 I/F  OC48 I/F

8ch OC3 I/F    4ch OC12 I/F    OC48 I/F

BLADE-TYPE OPTICAL TRANSMISSION APPARATUS

BACKGROUND OF THE INVENTION

1. Field of the Invention

The present invention generally relates to optical transmission apparatuses, and particularly relates to a small blade-type optical transmission apparatus.

2. Description of the Related Art

As its name "blade" suggests, a blade-type optical transmission apparatus has the functions of a large transmission apparatus contained in a single blade where these functions are provided by a plurality of types of conventional units. As an example of such a blade, a case called an "enclosure" having 3U size (U indicates a rack size) contains 6 to 20 planes so as to provide a high-density and large-capacity optical communication apparatus.

A rapid dissemination of network technology that we saw in a past few years is still expanding. In a metropolitan area, especially, there is an increasing demand for the high-density implementation of a main-trunk optical transmission apparatus that provides a basis for such network technology. Against this background, lateral-stacking-type apparatuses of 1U size as well as box-shape apparatuses called pizza boxes were developed. In order to answer the call for super-higher density implementation, further, the blade-type optical transmission apparatus has emerged as a new form of a transmission apparatus.

In metropolitan areas, the cost of a place where transmission apparatuses are installed is a problem. In general, a rent for a unit area is higher for the office space of carriers (telephone companies) than for ordinary office space because the carriers tend to use places and business offices that are provided with tighter security and better disaster control. If a large area size is necessary for the installment of a transmission apparatus, the cost associated with the land increases as the number of apparatuses increases. This ultimately results in an increase in the price of provided services. In consideration of this, carriers seek to maintain competitive cost advantages by reducing an area size for installment while keeping necessary communications-system performance. In response to these needs, the lateral-stacking-type apparatuses of rack mounting and the box-shape apparatuses called "pizza box" are developed.

With the advent of these apparatuses, the maximum number of units mountable per rack has doubled, resulting in a significant drop of the cost associated with a place necessary for the installment of a transmission system. The miniaturization and thinning of these apparatuses are achieved by limiting channel capacity, functionality, expandability, etc. As a recent trend, a "pay-as-you-grow" method has been attracting attention, in which the number of channels is increased in response to a demand increase while installing a WDM transmission system with a small number of channels at the beginning in order to reduce an initial investment.

These apparatuses may be stacked one over another, or may be arranged side by side as many as they are necessary. When priority is given to the higher density of implementation per rack, however, there is space that can still be saved. For example, these lateral-stacking-type or box type apparatuses are provided with an LED, a craft port, a LAN port, an alarm output, etc., for the maintenance purpose. They are necessary, however, only when setting up or maintenance is carried out. Some circuit components may not be necessary for each of the apparatuses. The blade-type optical transmission apparatus was developed with an aim of achieving higher density by eliminating such waste as described above.

FIG. 1 is an illustrative drawing showing the construction of a related-art optical transmission apparatus of a divided-shelf type. In FIG. 1, an HS (high speed) shelf accommodates high-speed network signals. An XC (cross-connect) shelf cross-connects signals. A LS (low speed) shelf accommodates low-speed service signals. A TC (timing complex) shelf attends to clock control with respect to a network and inside the apparatus. An MC (management complex) shelf performs the monitor control of the network and the apparatus. In this manner, modules (shelves) are provided on a function-by-function basis, and are put together to form an apparatus that satisfies the needs of the system.

FIG. 2 is an illustrative drawing showing the construction of a single-shelf-type optical transmission apparatus of a related-art metro system. FIG. 3 is a block diagram of the optical transmission apparatus of FIG. 3. In the figures, LS units and XC units are coupled through a back plane (BP), and the XC units and HS units are coupled one-to-one through the back plane BP. In FIG. 3, an upward direction, i.e., from the LS units to the HS unit through the XC unit, is indicated by arrows. A downward direction, i.e., from the HS unit, the XC unit, to the LS units, is connected through signal lines provided on the back plane.

Further, Patent Document 1, for example, discloses an apparatus in which boards carrying electrical circuits thereon are provided in a bookshelf form, and signals output from each board are connected through a back plane. Patent Document 2 discloses replacing electrical connections between a plurality of panels through a backboard with optical connections through optical paths, wherein the optical paths are arranged in a loop form.

[Patent Document 1]
Japanese Patent No. 3348757
[Patent Document 2]
Japanese Patent No. 2606612

A related-art optical transmission apparatus of the divided-shelf type tends to have an extremely large size, and requires a large initial investment because all the shelves are necessary even for an initial-stage configuration having a small number of channels. Further, it is not possible to adopt the "pay-as-you-grow" method in which the number of accommodated channels and the capacity of cross-connects are increased in response to a demand increase in the future. Moreover, the construction of the apparatus is extremely complicated, as exemplified by the provision of an interface circuit for connecting between the shelves that are divided.

In the single-shelf-type optical transmission apparatus of the related-art metro system, the back plane needs a number of signal pins sufficient to cope with the maximum capacity of the XC unit (i.e., the maximum number of the HS units and the LS units). Furthermore, even when the number of LS units is minimum, an XC unit is always necessary. Since the units of this apparatus are divided also on a function-by-function basis, a common circuit such as an XC unit is required in the initial configuration even if the configuration includes a small number of channels. This results in a high initial investment.

In this manner, the related-art divided-shelf-type or single-shelf-type configuration has a drawback in that the bulky size of apparatus makes it difficult to install the apparatus in limited space. Moreover, all types of units are necessary even for a minimum-number-of-channel configuration used at an initial stage after installment, and there is also a need to set aside spare units for expanding channels in the future. This gives rise to a problem in that the cost associated with the initial installment is high (i.e., profitability is low).

Moreover, since the units provided in the shelves are divided on a function-by-function basis rather than on a channel-capacity basis, the "pay-as-you-grow" method in which the number of accommodated channels and the capacity of cross-connects are increased in response to a subsequent demand increase is not applicable. Since the XC unit is required from an early stage after installment regardless of the number of accommodated channels, the cost of the apparatus is high despite the construction having a small number of channels. Furthermore, the construction of the apparatus is complicated, as exemplified by the provision of an interface circuit for connecting between the shelves that are divided. This results in a cost increase and an increase in the occurrence of failures.

In order to reduce the size of an apparatus, it is necessary to contrive ways to reduce the number of signal lines on the back plane. If all units are connected point-to-point in a matrix form, the number of signal lines becomes enormous, resulting in an enormous number of connector pins. Moreover, the use of a bus connection between units gives rise to a problem in that any given unit cannot transmit signals while another unit is occupying the bus connecting between the units.

Accordingly, there is a need for a blade-type optical transmission apparatus which facilitates the efficient use of space for installment and reduces the cost associated with the early stages of installment.

SUMMARY OF THE INVENTION

It is a general object of the present invention to provide a blade-type optical transmission apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a blade-type optical transmission apparatus particularly pointed out in the specification in such full, clear, concise, and exact terms as to enable a person having ordinary skill in the art to practice the invention.

To achieve these and other advantages in accordance with the purpose of the invention, the invention provides a blade-type optical transmission apparatus, including a plurality of main-signal blades, each of which is provided with an external optical signal interface unit, a cross-connect unit, and an internal optical signal interface unit, a blade enclosure in which the plurality of main-signal blades are enclosed, and a back plane which is situated inside the blade enclosure and provides a ring connection for the internal optical signal interface unit between the main-signal blades.

The blade-type optical transmission apparatus described above helps to achieve the efficient use of space for installment, thereby reducing a cost in an early period after installment.

According to another aspect of the invention, the blade-type optical transmission apparatus further includes a bypass blade, which is attached to a portion of the blade enclosure that is configured to receive one of the main-signal blades, and partitions the ring connection provided by the back plane.

The blade-type optical transmission apparatus described above makes it possible to partition the ring connection inside the blade.

According to another aspect of the invention, the blade-type optical transmission apparatus further includes a through blade, which is attached to a portion of the blade enclosure that is configured to receive one of the main-signal blades, and allows a through passage of a main signal inside the through blade as the main signal is exchanged with the back plane.

The blade-type optical transmission apparatus described above successfully maintains a signal coupling on the ring connection even when a main-signal blade is not inserted.

According to another aspect of the invention, a blade-type optical transmission apparatus further includes a power blade, which is attached to a portion of the blade enclosure that is configured to receive one of the main-signal blades, and amplifies a main signal exchanged with the back plane.

The blade-type optical transmission apparatus described above successfully copes with a situation in which the attenuation of a main signal transmitted through the ring connection is significant.

According to another aspect of the invention, the blade-type optical transmission apparatus described above further includes a joint blade, which is attached to a portion of the blade enclosure that is configured to receive one of the main-signal blades, and exchanges a main signal, exchanged with the back plane, with a back plane of another blade-type optical transmission apparatus.

The blade-type optical transmission apparatus described above makes it possible to expand the ring connection of the back plane, thereby increasing the number of attachable blades.

BRIEF DESCRIPTION OF THE DRAWINGS

Other objects and further features of the present invention will be apparent from the following detailed description when read in conjunction with the accompanying drawings, in which:

FIGS. 17A and 17B are illustrative drawings for explaining a bypass adaptor;

FIG. 18 is used, and signals of OC-3 and OC-12 are multiplexed into OC-48 as shown in FIG. 15;

DESCRIPTION OF THE PREFERRED EMBODIMENTS

In the following, embodiments of the present invention will be described with reference to the accompanying drawings.

Figure 1:
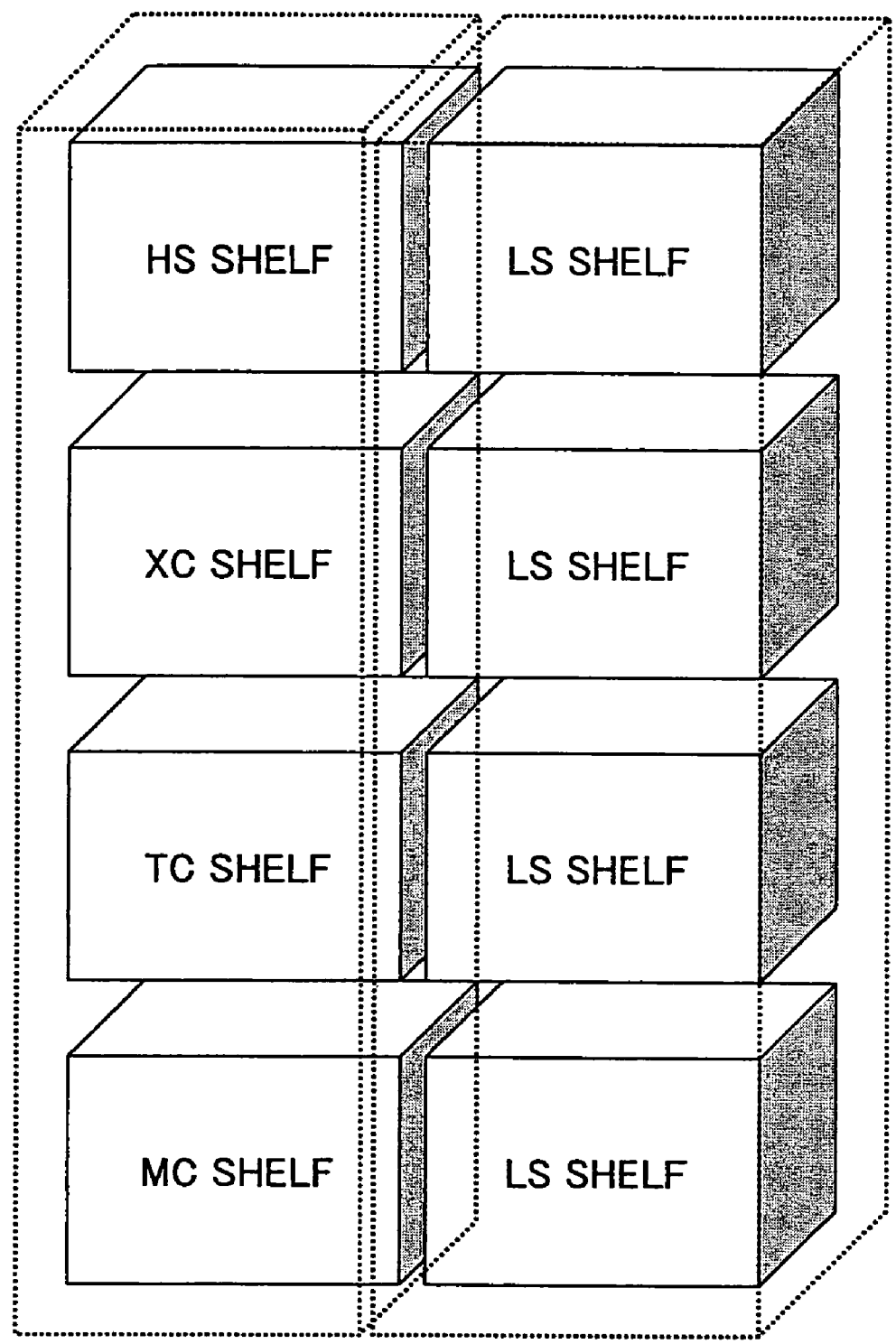
FIG. 1 is an illustrative drawing showing the construction of a related-art optical transmission apparatus of a divided-shelf type.
Figure 2:
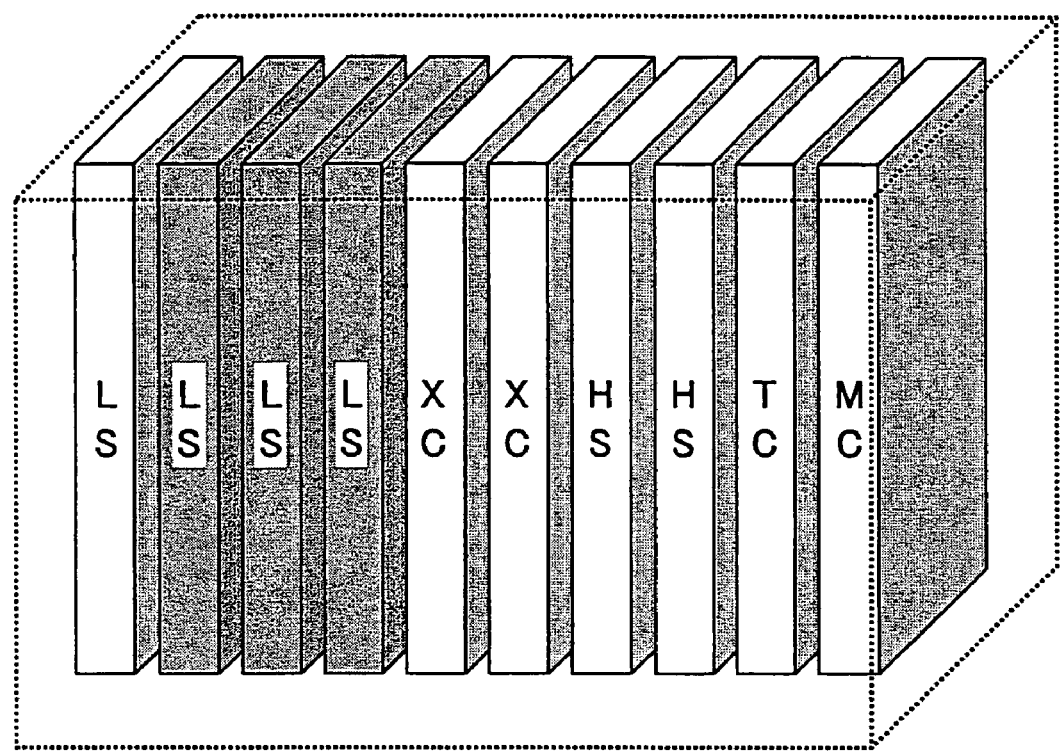
FIG. 2 is an illustrative drawing showing the construction of a single-shelf-type optical transmission apparatus of a related-art metro system.
Figure 3:
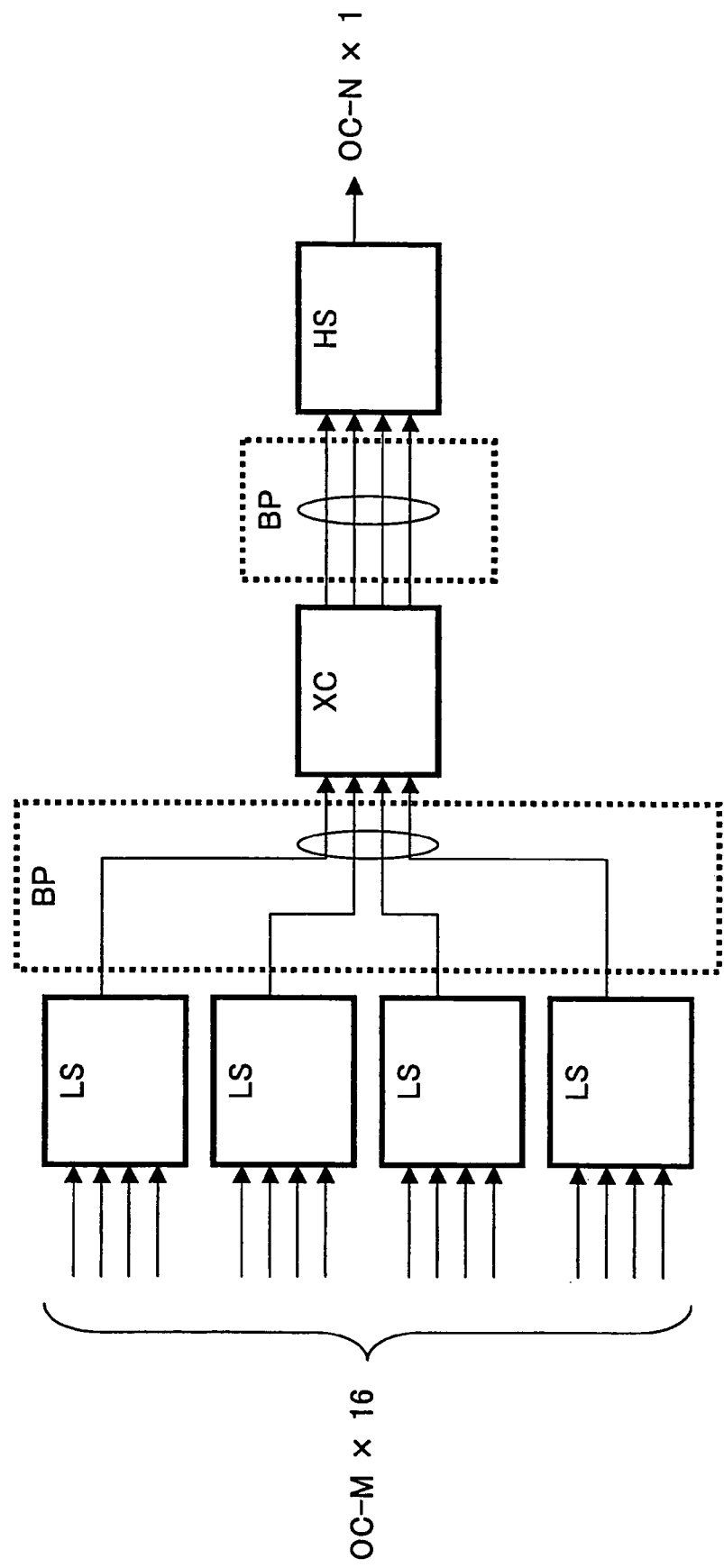
FIG. 3 is a block diagram of the optical transmission apparatus of FIG. 3.
Figure 4:
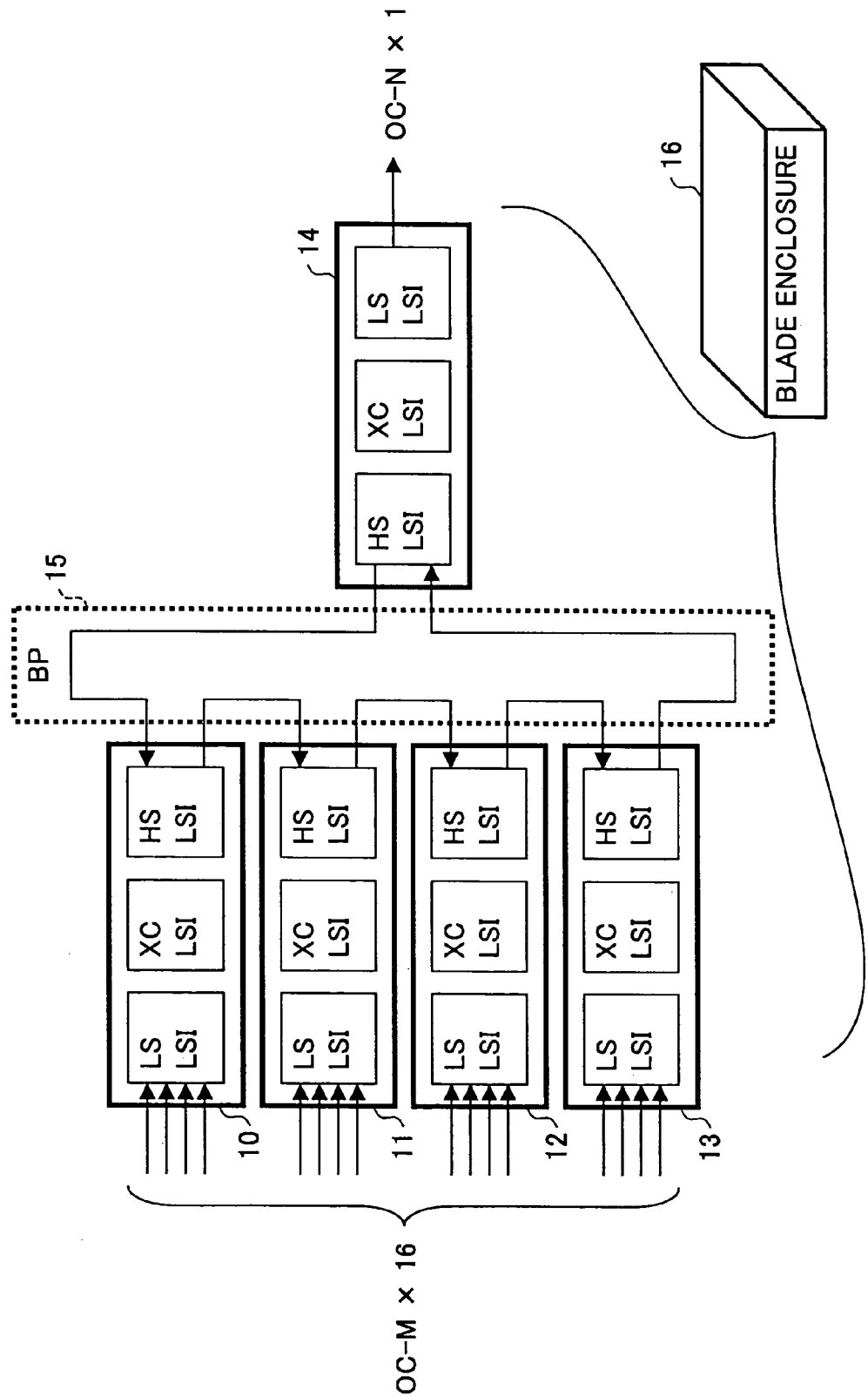
FIG. 4 is a schematic diagram for explaining the principle of a blade-type optical transmission apparatus according to the invention.

FIG. 4 is a schematic diagram for explaining the principle of a blade-type optical transmission apparatus according to the invention. In this invention, a HS (high speed) shelf, an XC (cross-connect) shelf, and an LS (low speed) shelf, which correspond to the functional modules of a divided-shelf type or a single-shelf type, are each implemented as a system LSI, and are mounted on a circuit board to provide blades (main signal blades) 10-14.

The HS shelf is capable of inputting/outputting a 40-Gbps signal, for example, and the LS shelf is capable of inputting/outputting a 10-Gbps signal, for example. Moreover, the blades 10-14 are not limited to the construction having the three system LSIs, and may be provided with a single system LSI, for example.

The main signal blades 10-14 are coupled together through a ring connection via optical waveguides provided on the back plane 15, and are enclosed with high density inside a blade enclosure 16, thereby achieving a super-micro blade-type optical transmission apparatus. A single blade provides all the functions equivalent to a single related-art apparatus.

Figure 5:
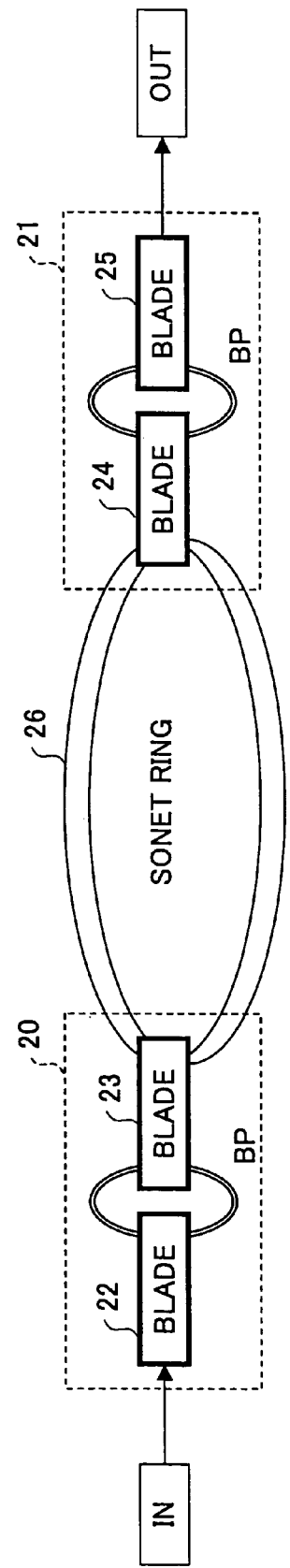
FIG. 5 is an illustrative drawing showing the construction of a transmission system based on the blade-type optical transmission apparatus according to the invention.

As shown in FIG. 5, the blade-type optical transmission apparatus of the invention is constructed by combining a plurality of blades 22 and 23 inside a blade enclosure 20, and also by combining a plurality of blades 24 and 25 inside a blade enclosure 21. Signal transmission is achieved by the XC_LSI of each blade providing add/drop/through channel settings.

Channel settings between a signal input (IN) and a signal output (OUT) are defined by the add/drop/through channel settings of each blade. In the blade enclosure 20, an add setting is made in the blade 22, and a drop setting is made in the blade 23, thereby achieving transmission to a SONET ring 26. In the blade enclosure 21, after going through the SONET ring 26, an add setting is made in the blade 24, and a drop setting is made in the blade 25. This achieves proper channel settings for signal transmission. These channel settings control the XC_LSI through a controller (CPU) inside the blade according to user setting information.

In order to achieve side reduction, the back plane which connects between each blade must be reduced in size. In order to achieve this, it is required to decrease the number of transmission paths and the number of connector pins provided on the back plane. To this end, the present invention uses a ring connection for transmission paths on the back plane.

Figure 6:
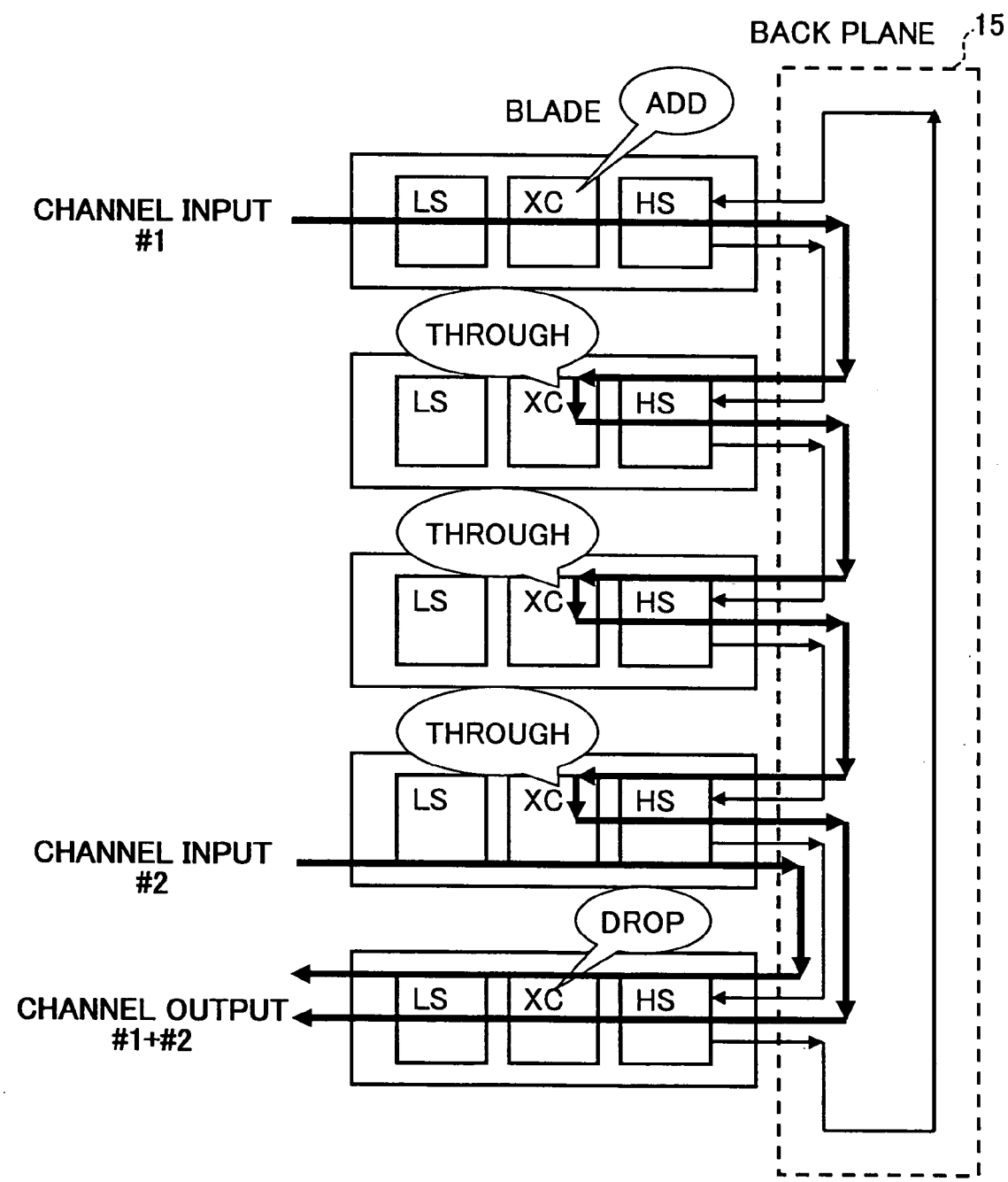
FIG. 6 is an illustrative drawing for explaining a case in which the number of blades is five.

FIG. 6 is an illustrative drawing for explaining a case in which the number of blades is five. For the sake of clarity of illustration, only a one-way transmission path is illustrated.

In actual signal transmission for real operation, a two-way (bi-directional) ring is employed. In FIG. 6, the five main signal blades 10-14 are connected to the ring transmission path provided on the back plane 15. The XC_LSI of each blade performs cross-connect of add/drop/through in the back plane direction by use of the ADM (add drop multiplex) function. This makes it possible to transmit the inputs of channels accommodated in a blade to any desired blade for outputting therefrom.

For example, a channel input #1 supplied to the LS_LSI of the main signal blade 10 is added by the XS_LSI of the main signal blade 10, and is let through by the XS_LSI of the main signal blades 11, 12, and 13, followed by being dropped by the XS_LSI of the main signal blade 14, and then output from the LS_LSI of the main signal blade 14. A channel input #2 supplied to the LS_LSI of the main signal blade 13 is added by the XS_LSI of the main signal blade 13, and is dropped by the XS_LSI of the main signal blade 14, followed by being output from the LS_LSI of the main signal blade 14.

For an interface device of the back plane 15, the invention may adopt a VCSEL (vertical cavity surface emitting laser). The VCSEL emits light in a direction perpendicular to the blade substrate, and an optical waveguide provides a signal coupling between the blade and the back plane.

The back-plane interface may alternatively be provided through electrical signals rather than through optical signals. Transmission capacity equivalent to 10 Gbps can be achieved through electrical signals by use of 4×3.125 bps (8B/10B conversion of 2.5 G) parallel configuration.

Figure 7:
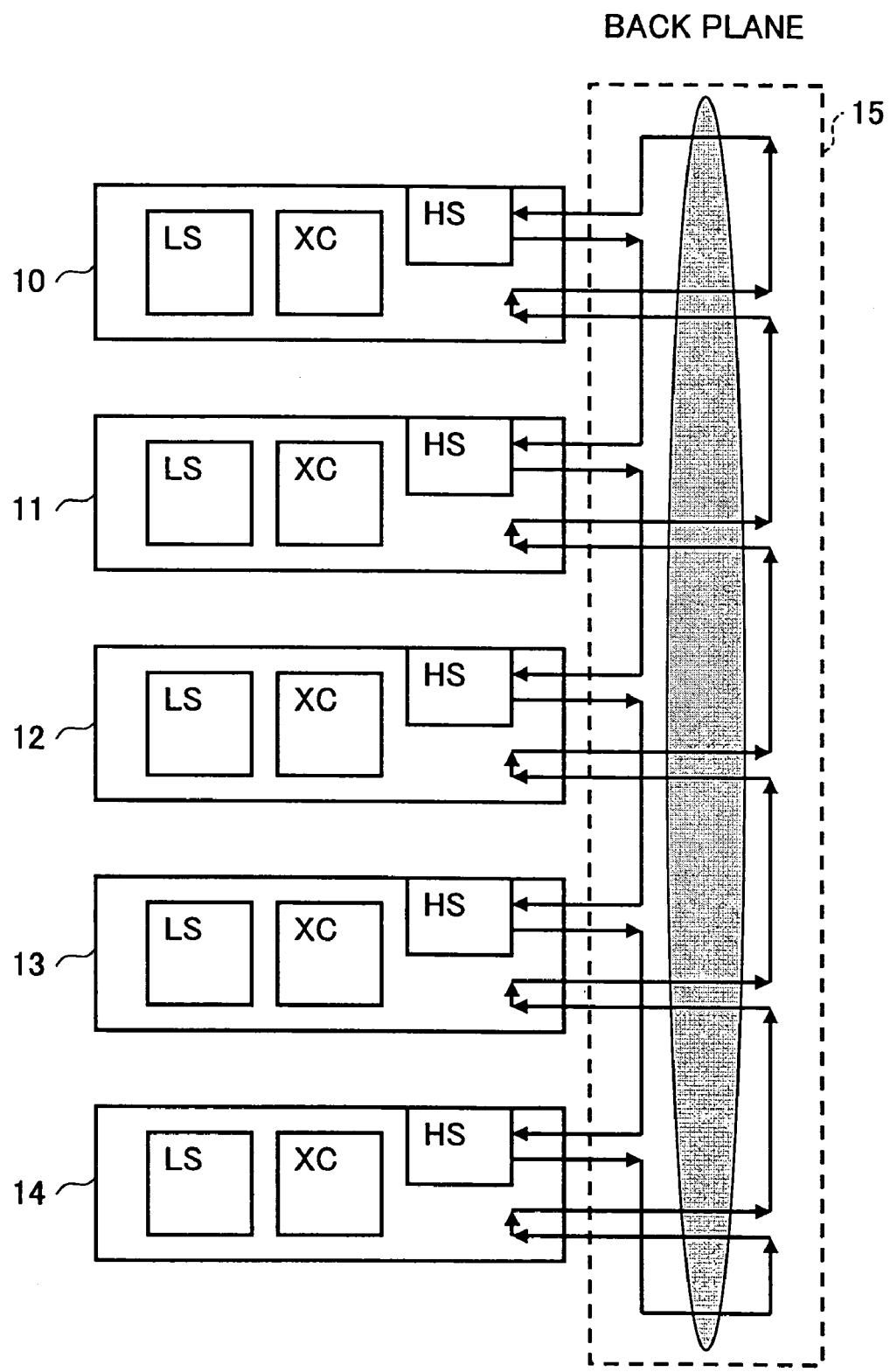
FIG. 7 is an illustrative drawing for explaining the division of a ring.
Figure 8:
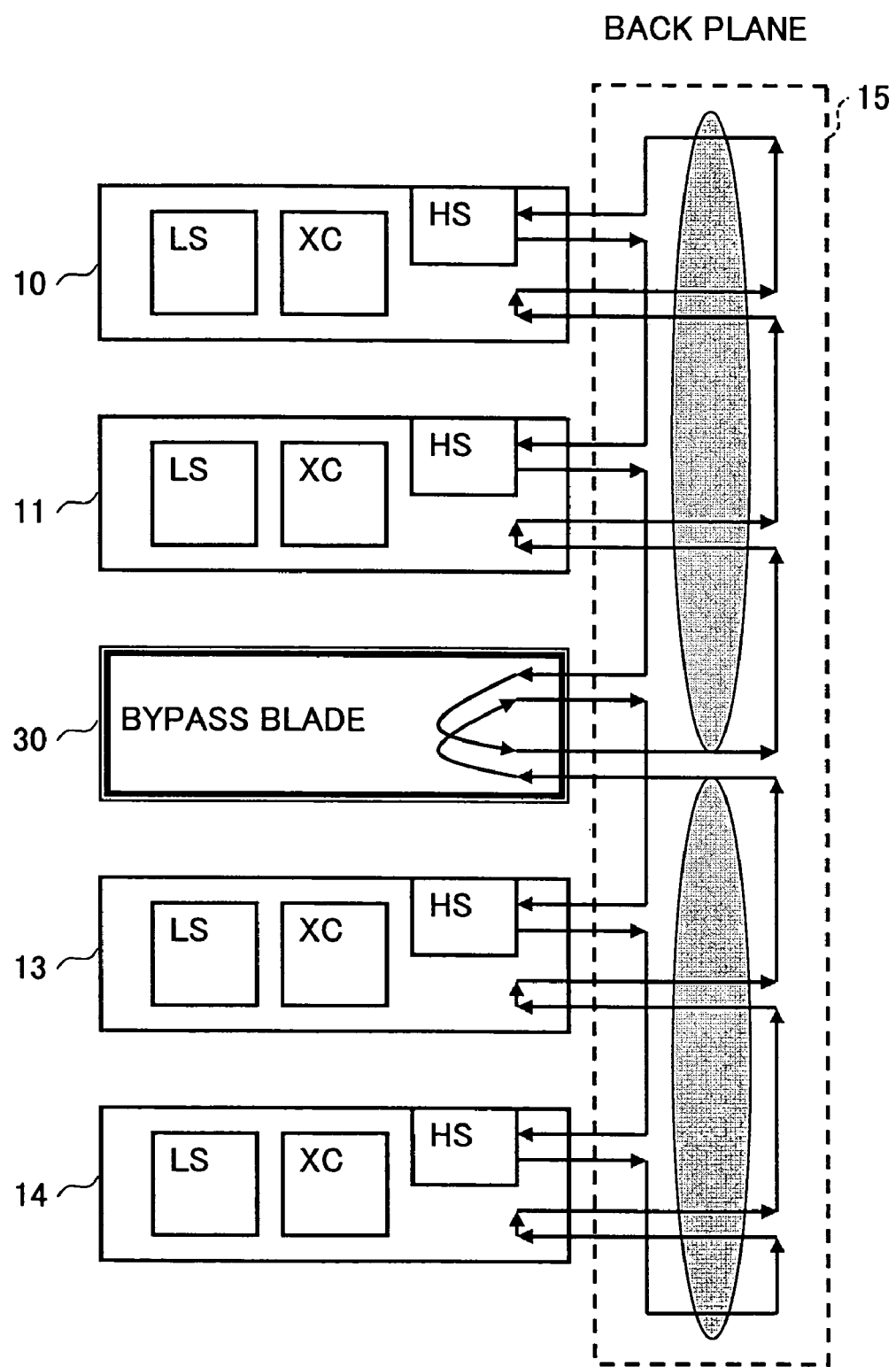
FIG. 8 is an illustrative drawing for explaining the division of a ring.

FIG. 7 is an illustrative drawing for explaining the division of a ring. In the present invention, as shown in FIG. 7, the ring transmission path on the back plane 15 is pulled into a blade at two places. One of these two places is connected to the HS_LSI, and the other is let pass without subjected to any processing. With this provision, a bypass blade 30 as shown in FIG. 8 may be attached according to the need of the device configuration, thereby dividing (partitioning) the ring. The bypass blade 30 divides the ring by connecting one of the two portions to the other of the two portions of the ring transmission path that is pulled into the blade. The bypass blade 30 is attachable to any desired slot that is selected from the slots for receiving the main signal blades 10-14. With this provision, the partitioning of the back plane 15 is flexibly changed within the blade enclosure 16.

Figure 9:
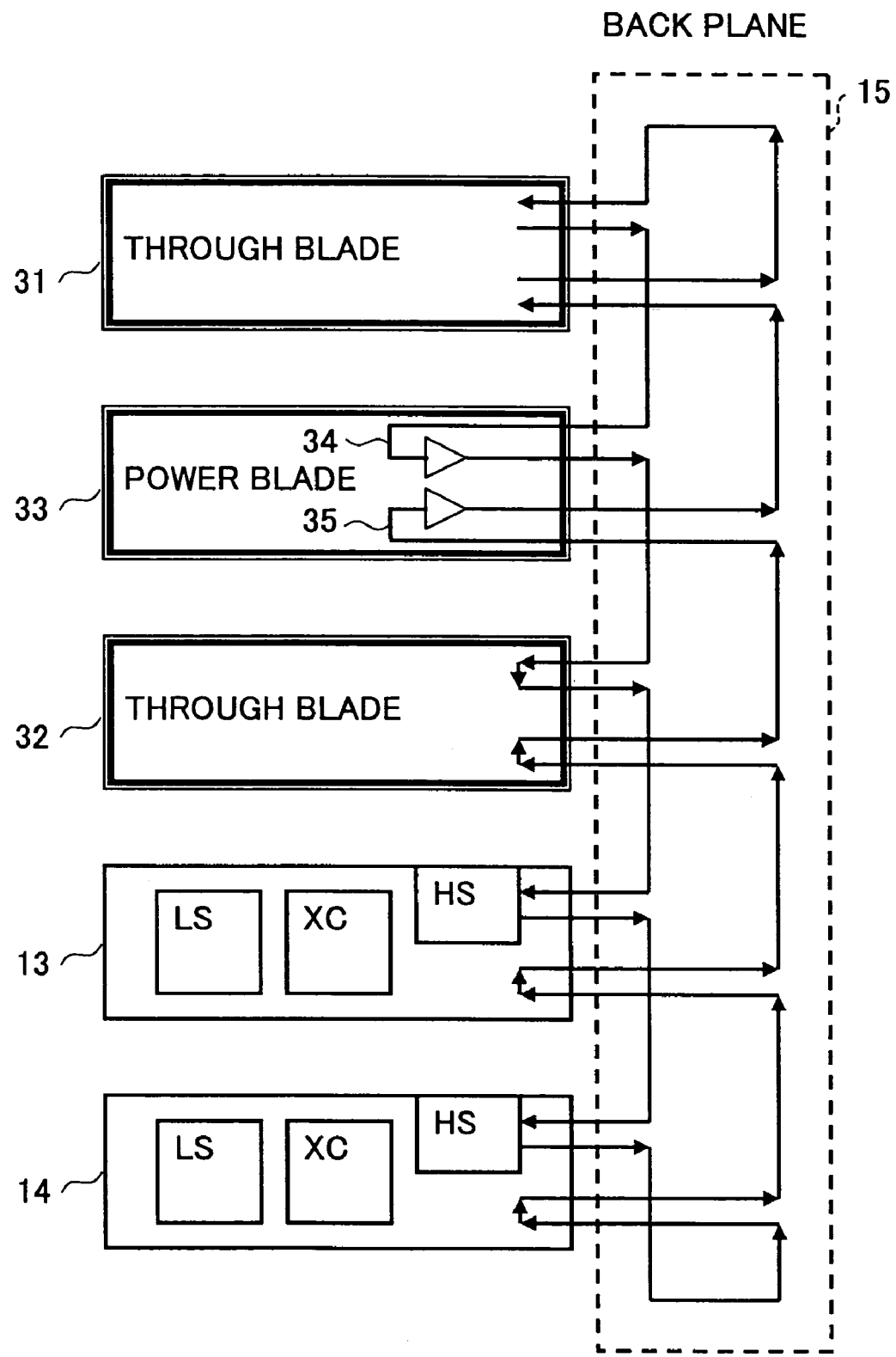
FIG. 9 is an illustrative drawing for explaining the provision of a through blade.

FIG. 9 is an illustrative drawing for explaining the provision of a through blade. As shown in FIG. 9, through blades 31 and 32 may be attached to unused slots thereby to provide through-connections for the back plane 15. If signal attenuation increases by use of the multiple stages of through blades or the like, a power blade 33 with built-in optical amplifiers 34 and 35 may be employed. The optical amplifiers 34 and 35 provide a reproduction-and-relay function capable of error correction.

Figure 10:
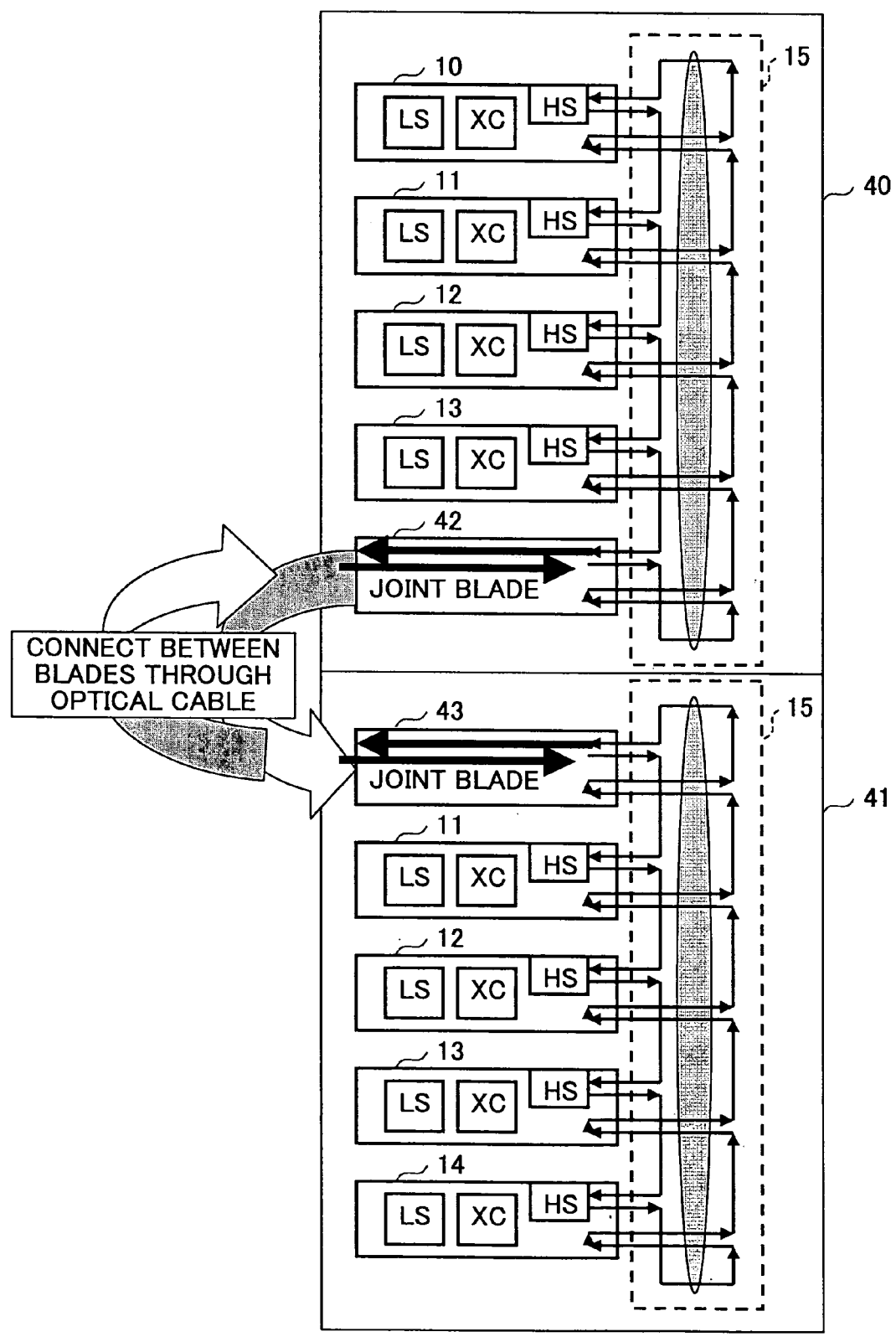
FIG. 10 is an illustrative drawing for explaining the expansion of a ring.

Furthermore, if there is not a sufficient number of slots for attaching blades, joint blades 42 and 43 are attached to the respective back planes 15 of the blade enclosures 40 and 41 as shown in FIG. 10, with an optical cable connection between the joint blades 42 and 43. With this provision, the ring of the back plane 15 is extended.

Figure 11:
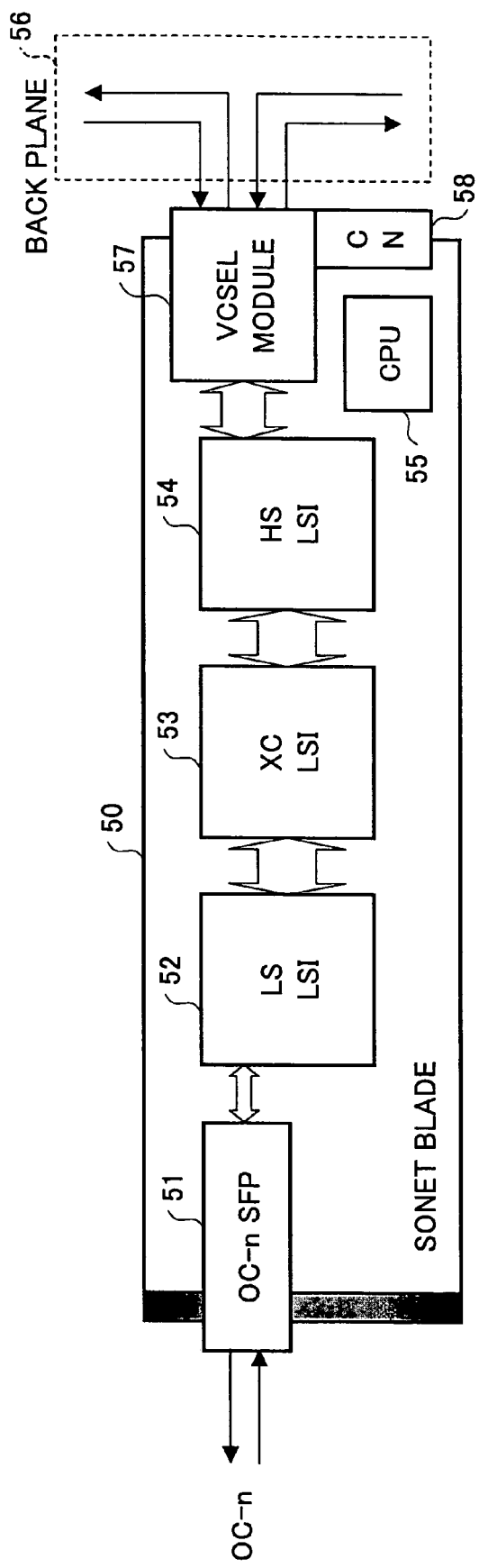
FIG. 11 is a block diagram showing a first embodiment of the main-signal blade according to the invention.

FIG. 11 is a block diagram showing a first embodiment of the main-signal blade according to the invention. In FIG. 11, a small-size board 50 that is the main-signal blade (SONET blade) carries an OC-n_SFP (opptical carrier-n small form-factor pluggable) light transceiver 51 for accommodating optical signals from an exterior, an LS_LSI 52 for accommodating low-speed service signals, an XC_LSI 53 for performing signal cross-connect, an HS_LSI 54 for accommodating high-speed network signals, and a CPU 55 for attending to internal apparatus control.

A back plane 56 is an optical back plane which is comprised of optical waveguides (or optical parallel link cables) and optical devices. Furthermore, a VCSEL module 57 with a built-in optical sheet connector is provided on the small-size board 50 for the purpose of coupling main-signal data to the back plane. An interface on the side of the back plane 56 is a SONET OC-192 (10 Gbps). Moreover, a sheet connector (CN) 58 is provided on the small-size board 50 for the purpose of communicating with a power supply and other blades.

Figure 12:
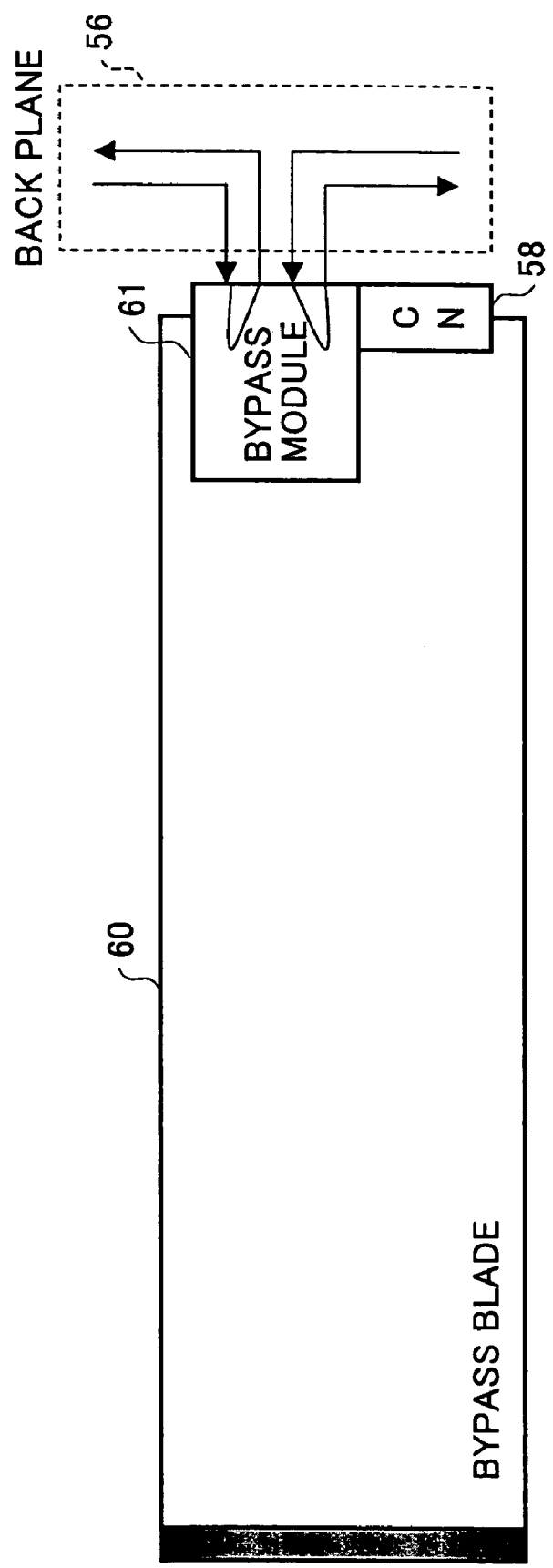
FIG. 12 is a block diagram showing a first embodiment of the bypass blade according to the invention.

FIG. 12 is a block diagram showing a first embodiment of the bypass blade according to the invention. In FIG. 12, a bypass module 61 is provided on a small-size board 60 of the bypass blade. The bypass module 61 has two portions of the ring transmission path of the back plane 56 pulled into the bypass module 61, and connects one to the other. Moreover, the sheet connector (CN) 58 is provided on the small-size board 60 for the purpose of communicating with a power supply and other blades.

Figure 13:
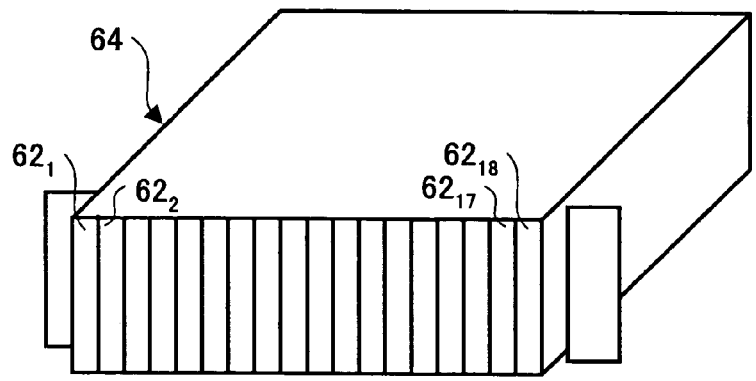
FIG. 13 is an illustrative drawing showing an exterior appearance of a blade-type optical transmission apparatus according to an embodiment of the invention.
Figure 14:
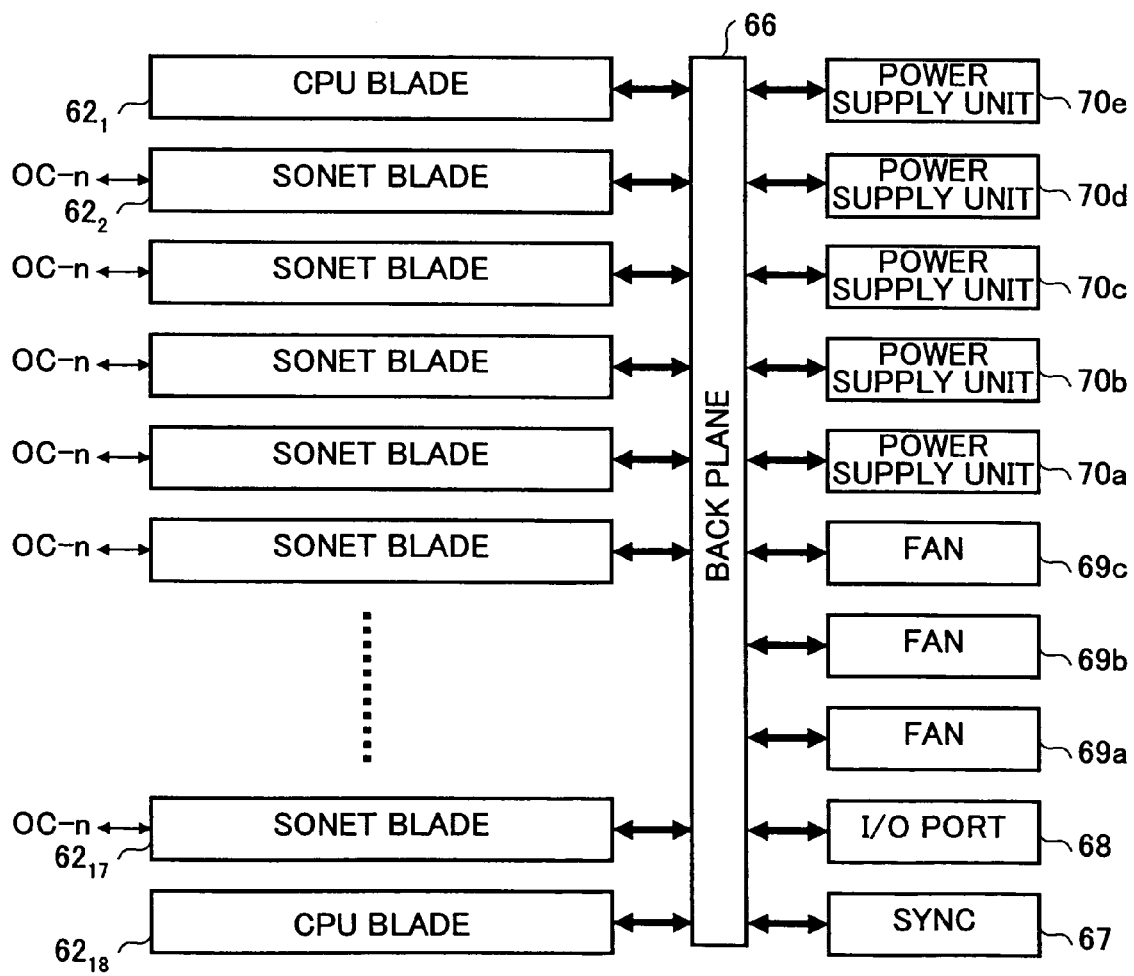
FIG. 14 is a block diagram of the blade-type optical transmission apparatus of FIG. 13.

FIG. 13 is an illustrative drawing showing an exterior appearance of the blade-type optical transmission apparatus according to an embodiment of the invention. FIG. 14 is a block diagram of the blade-type optical transmission apparatus of FIG. 13. As shown in FIG. 13, the blade-type optical transmission apparatus of the invention is constructed by attaching 16 main-signal blades $62_2$-$62_{17}$ such as SONET blades to a blade enclosure 64 that is provided with 18 slots. The slots situated at the extreme ends of the blade enclosure 64 receive CPU blades $62_1$ and $62_{18}$, which monitor and control each blade and common functional modules inside the blade enclosure 64, and display the status of the apparatus by LEDs or the like.

As shown in FIG. 14, the 16 main-signal blades $62_2$-$62_{17}$ are connected for shared use to a ring transmission path of a single back plane 66. A bypass blade as shown in FIG. 12 may be inserted into a desired slot among the slots for receiving the main-signal blades $62_2$-$62_{17}$, thereby dividing (partitioning) the ring of the back plane 66 into a plurality of rings. With this provision, the capacity of the back plane is efficiently utilized according to the need of the device configuration.

The main-signal blades $62_2$-$62_{17}$ are coupled to main signals to be transmitted. A client side is provided with various blades corresponding to respective interfaces such as SONET and Ethernet (registered trademark) (10B/100B and GbE). A SYNC module 67 that is a common functional module performs clock control in the blade enclosure and synchronization control for the optical transmission apparatus. An I/O port 68 provides a coupling for an alarm signal input/output into/from the optical transmission apparatus and a coupling for an external interface. Fans 69a-69c perform compulsive air cooling in the blade enclosure. Power supply units 70a-70e supply power to the blade enclosure. The fans 69a-69c and the power supply units 70a-70e are provided according to a redundant configuration. The main-signal blades $62_1$-$62_{18}$, the SYNC module 67 being a common functional module, and the power supply units 70a-70e are connected to the back plane 66 either from the front side or from the back side.

Figure 15:
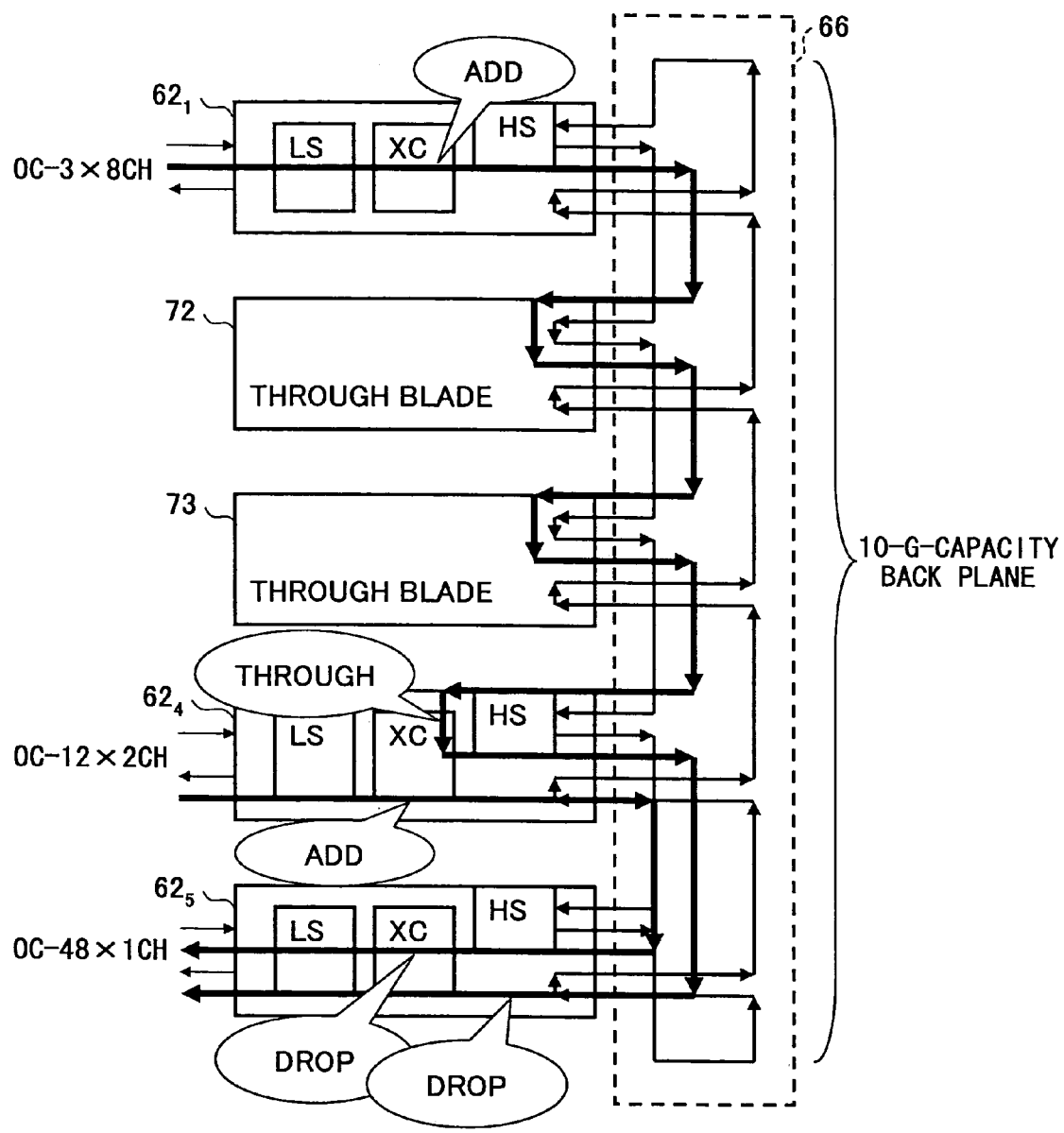
FIG. 15 is an illustrative drawing for explaining the add/drop operation of the blade-type optical transmission apparatus according to the invention.

FIG. 15 is an illustrative drawing for explaining the add/drop operation of the blade-type optical transmission apparatus according to the invention. An illustration provided here is directed to a case in which client-side signals of 8-channel OC-3 (155 Mbps) and 2-channel OC-12 (622 Mbps), which are supplied through the respective main-signal blades $62_1$ and $62_4$, are multiplexed into a network-side signal of 1-channel OC-48 (2.4 Gbps) for transmission from the main-signal blade $62_5$ to a network.

The XC_LSI of the main-signal blades $62_1$, and $62_4$ is set to the "add" channel setting, and the XC_LSI of the main-signal blade $62_5$ is set to the "drop" channel setting, thereby achieving signal transmission through the back plane 66 as illustrated in FIG. 15. Through blades 72 and 73 are attached to unused slots for the purpose of providing through-connections for the signals on the back plane 66.

Figure 16:
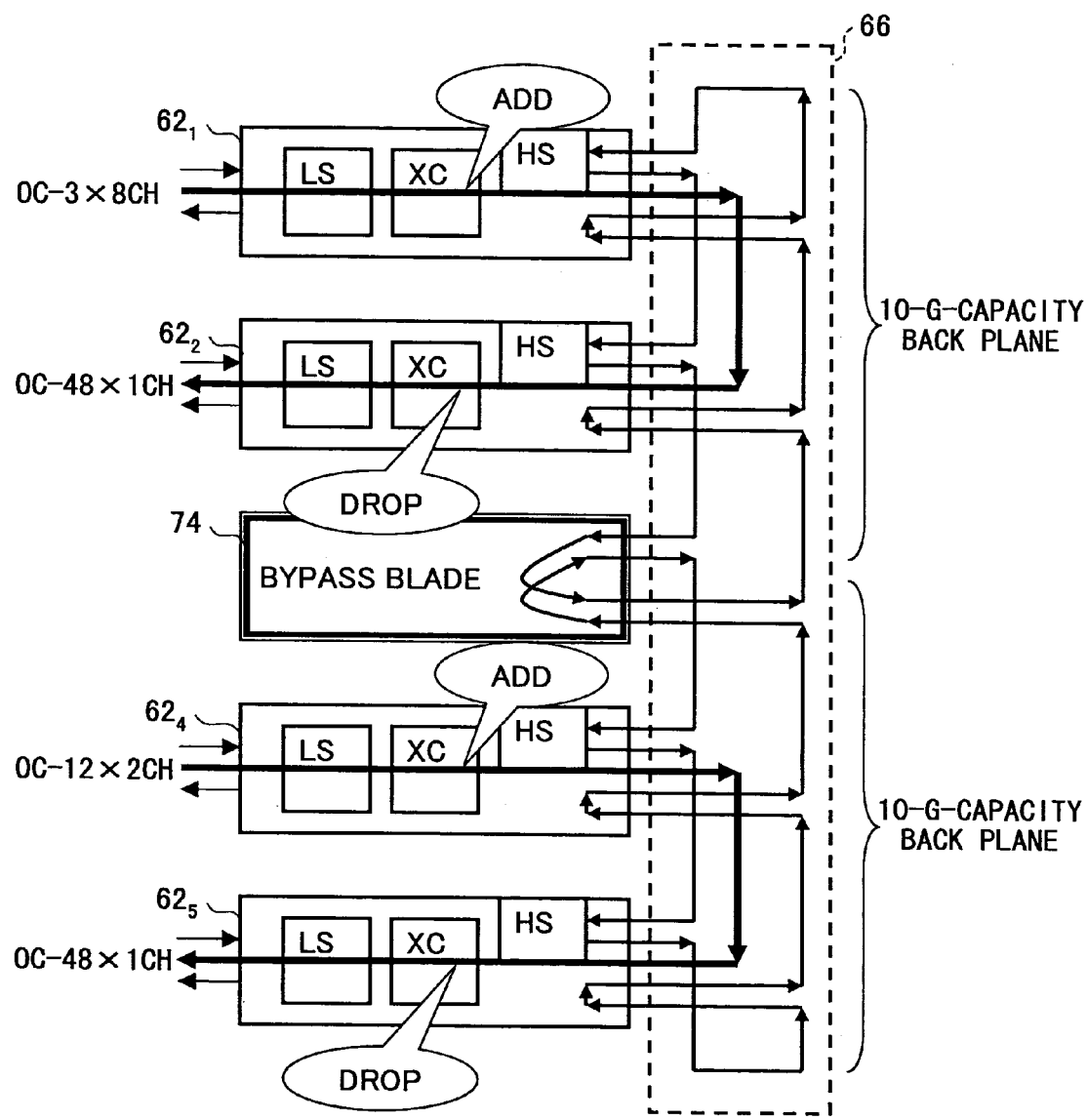
FIG. 16 is an illustrative drawing for explaining an embodiment in which a back board is divided (partitioned) by a bypass blade.

FIG. 16 is an illustrative drawing for explaining an embodiment in which the back board is divided (partitioned) by a bypass blade. In this example, client-side signals of OC-3 are increased from 8 channels to 16 channels, and client-side signals of OC-12 are increased from 2 channels to 4 channels. In response, the network-side signals (OC-48) are expanded.

Specifically, the back plane 66 is partitioned by inserting the bypass blade 73, so that the channels in existence before such partitioning and the channels added by such partitioning together occupy the back plane having the 10-G capacity. This method can flexibly cope with a future increase of channel capacity, and, also, makes it possible to partition the device structure on a channel-user-specific basis.

In the present invention, a bypass connector may be used, in place of a through blade, so as to provide a bypass connection for an optical signal on the back plane when a blade is taken off and not in place. FIGS. 17A and 17B are illustrative drawings for explaining a bypass adaptor. When the blade is not present, as shown in FIG. 17A, a bypass adapter 75 with a condenser lens is pushed out by a spring 76. At this position, the bypass adapter 75 with the condenser lens provides an optical coupling between an optical fiber 78a provided in a back board mechanism 77a and an optical fiber 78b provided in a back board mechanism 77b.

When a blade is inserted as shown in FIG. 17B, the bypass adapter 75 with the condenser lens is pushed in by the end of the main-signal blade 621. With this positioning, the light receiving surface and light emitting surface of the VCSEL module 57 of the main-signal blade $62_1$ are optically coupled to the optical fiber 78a of the back board mechanism 77a and the optical fiber 78b of the back board mechanism 77b, respectively.

In the present invention, electrical signals may alternatively be used as signals on the back plane. In the case of electrical signals, a 2.5-Gbps SONET signal is converted into a 3.125-Gbps signal through 8B/10B conversion, thereby achieving transmission between blades (4-fold parallel configuration is used for the 10-G capacity).

Figure 18B:
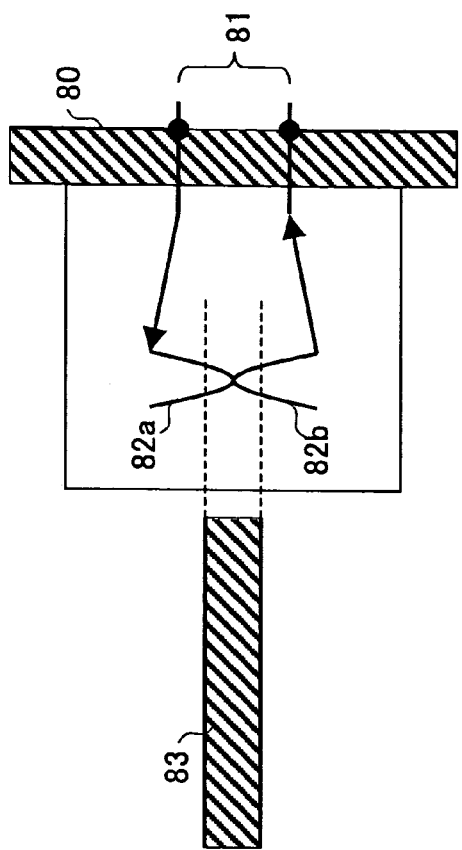
FIGS. 18A and 18B are illustrative drawings for explaining an electrical bypass connector.
Figure 18A:
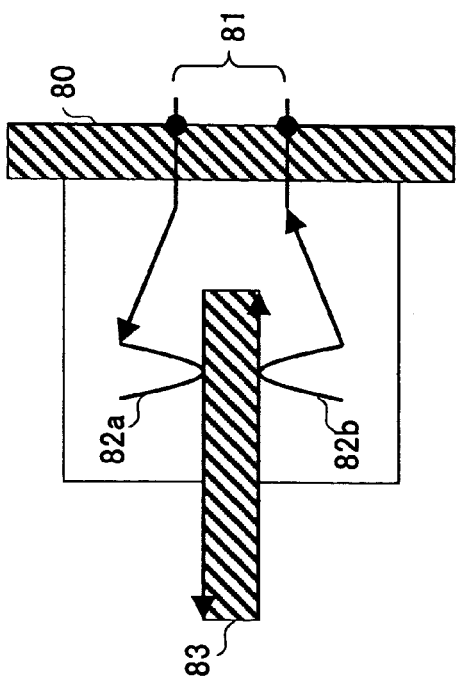

In the case of electrical signals, a card edge connector 81 fixed to a back plane board 80 as shown in FIG. 18A is used as a bypass connector. When a card is inserted as shown in FIG. 18A, elastic terminal members 82a and 82b of the card edge connector 81 come in contact with wires provided on the upper and lower surfaces of a blade board 83. When the blade is extracted as shown in FIG. 18B, the terminal members 82a and 82b of the card edge connector 81 come in contact with each other to provide a coupling.

Figure 19:
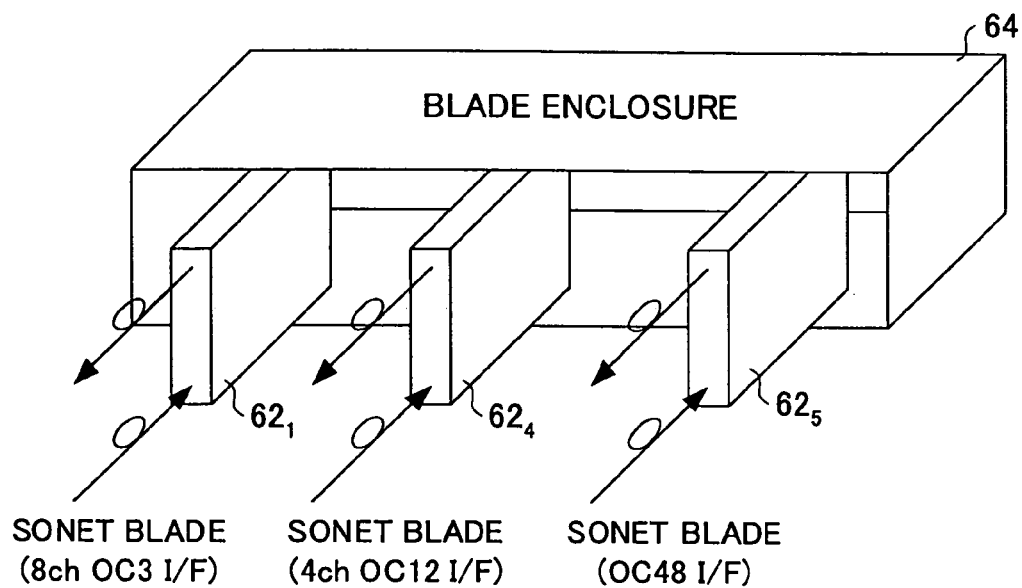
FIG. 19 is an illustrative drawing showing a construction in which a back plane with the bypass connector shown in FIG. 17

FIG. 19 is an illustrative drawing showing a construction in which a back plane with the bypass connector shown in FIG. 17 or FIG. 18 is used, and signals of OC-3 and OC-12 are multiplexed into OC-48 as shown in FIG. 15. In FIG. 19, the main-signal blades 621, 624, and 625 are inserted into the blade enclosure 64 for connection to the back plane 66. In the embodiment as described above, it suffices to provide the main-signal blades no more than necessary for achieving required capacity for connection to the back plane, thereby eliminating a need for excessive main-signal blades at the time of initial installment.

Figure 20:
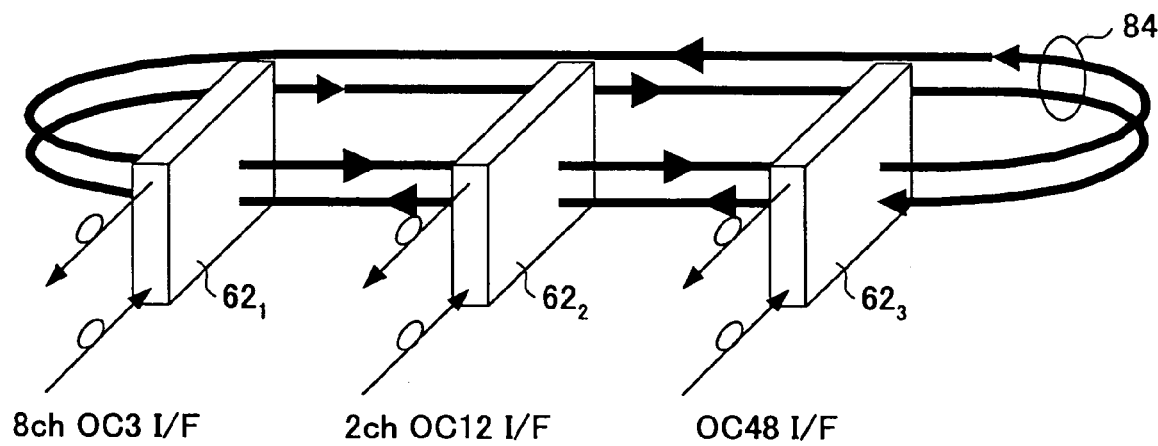
FIG. 20 is an illustrative drawing for explaining a blade-type optical transmission apparatus in which a two-fiber BLSR is used.
Figure 21:
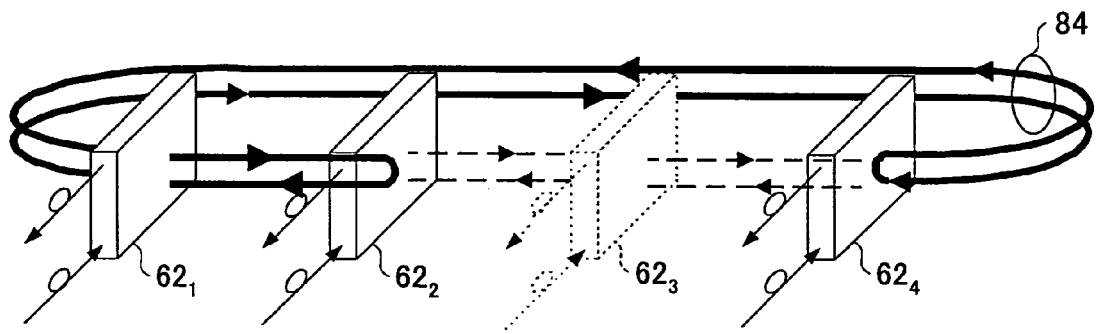
FIG. 21 is an illustrative drawing for explaining the blade-type optical transmission apparatus in which a two-fiber BLSR is used.
Figure 22:
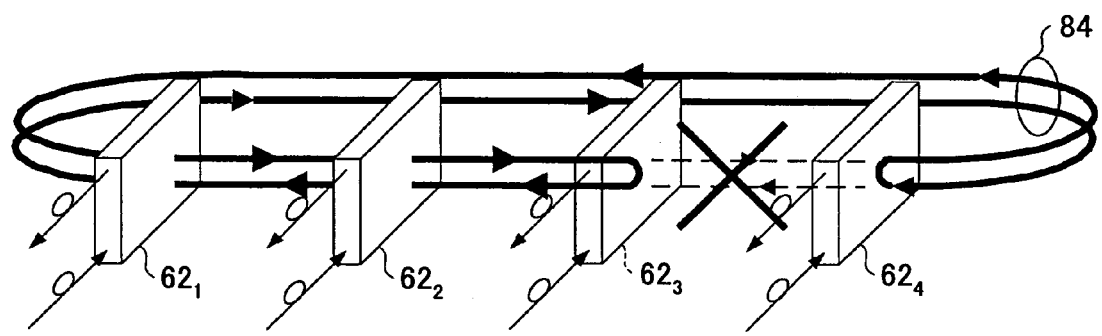
FIG. 22 is an illustrative drawing for explaining the blade-type optical transmission apparatus in which a two-fiber BLSR is used.

FIG. 20, FIG. 21, and FIG. 22 are illustrative drawings for explaining a blade-type optical transmission apparatus in which a two-fiber BLSR is used. As shown in FIG. 20, a two-fiber BLSR (bi-directional line switched ring) 84, which is currently used in SONET, is employed for optical coupling between blades.

In FIG. 21, the main-signal blade $62_3$ is taken out among the main-signal blades $62_1$-$62_4$. In FIG. 22, the back plane 66 suffers failure (disconnection, transmission-path defect, or the like) between the main-signal blades $62_3$ and $62_4$. In these cases, the use of the two-fiber BLSR achieves bridge processing or switch processing capable of high-speed switching through the SONET protocol, so that its control mechanism can maintain a current signal flow as it is.

In FIG. 20, another two-fiber BLSR, in addition to the two-fiber BLSR 84, may be connected to the main-signal blade $62_4$, for example, among the main-signal blades $62_1$-$62_4$, so that the main-signal blade 624 connects between the two BLSRs.

Figure 23:
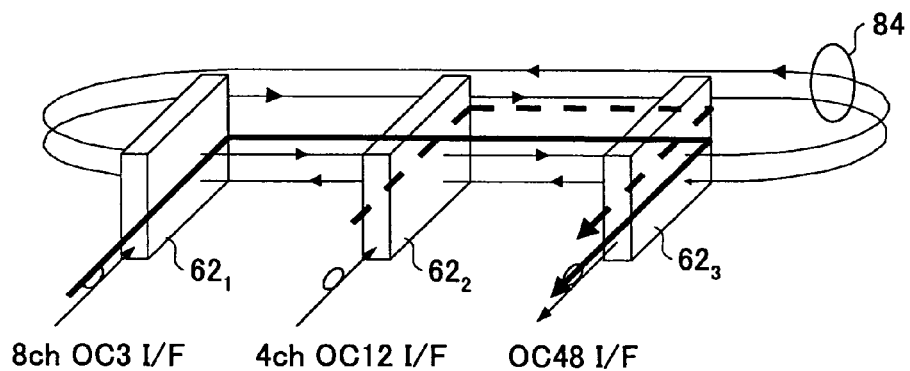
FIG. 23 is an illustrative drawing for explaining add/drop/through operations associated with a two-fiber BLSR provided in the back plane.

FIG. 23 is an illustrative drawing for explaining add/drop/through operations associated with the two-fiber BLSR 84 provided in the back plane 66. The XS_LSI of the main-signal blade $62_1$ performs an add process, and the XS_LSI of the main-signal blade $62_2$ carries out an add process and a through process for signals supplied from other main-signal blades, with the XS_LSI of the main-signal blade $62_3$ performing a drop process.

In the back plane 66 having the 10-Gbps capacity in total, the use of a two-fiber BLSR means 5 Gbps for current use and 5 Gbps as a reserve.

Figure 24A:
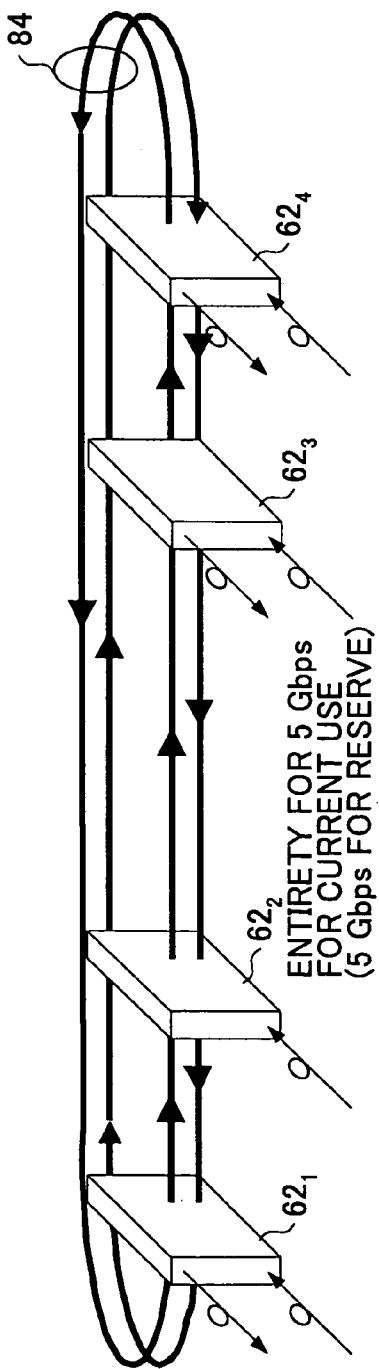
FIGS. 24A and 24B are illustrative drawings for explaining the blade-type optical transmission apparatus in which the two-fiber BLSR is used.
Figure 24B:
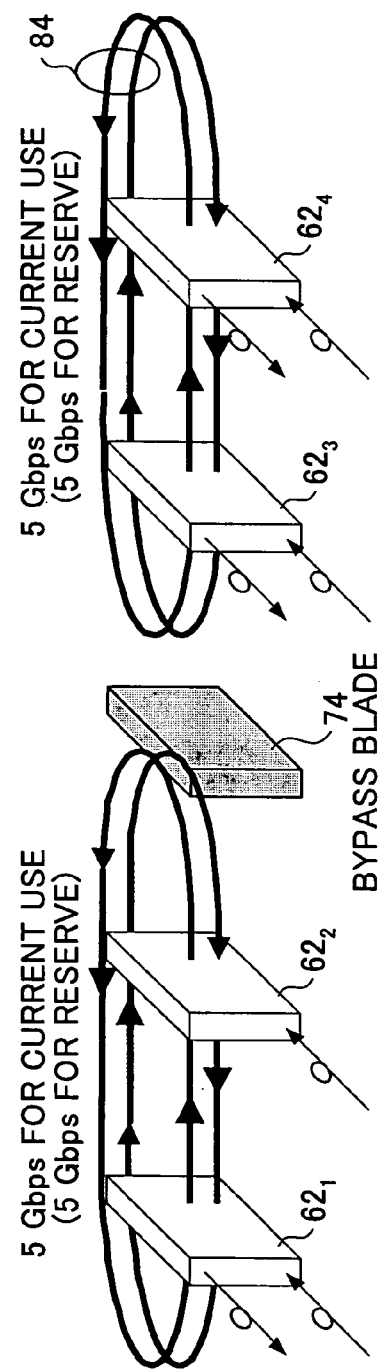

FIGS. 24A and 24B are illustrative drawings for explaining the blade-type optical transmission apparatus in which the two-fiber BLSR is used. In FIG. 24A, the entirety of the main-signal blades 621-624 performs switching with respect to 5-Gbps signals for current use. In FIG. 24B, the use of a bypass blade 74 provides for the switching of 5-Gbps signals for current use to be carried out between the main-signal blades 621 and 622, and provides for the switching of 5-Gbps signals for current use to be carried out between the main-signal blades 623 and 624. This achieves the efficient use of transmission bands.

Figure 25:
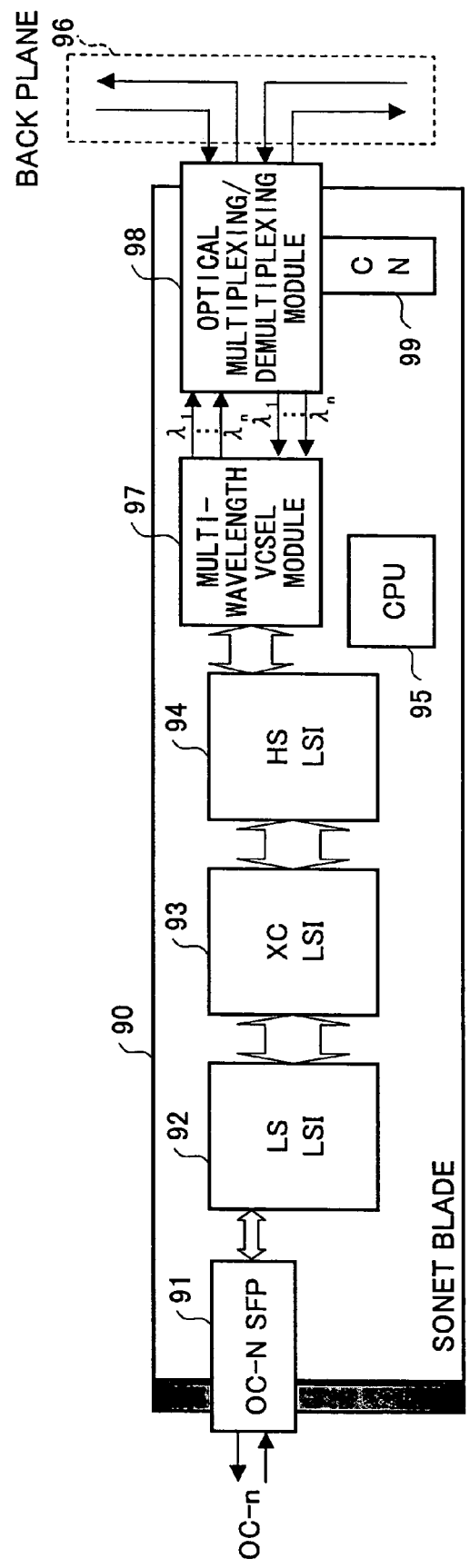
FIG. 25 is a block diagram showing another embodiment of the main-signal blade according to the invention.

FIG. 25 is a block diagram showing another embodiment of the main-signal blade according to the invention. In FIG. 25, a small-size board 90 that is the main-signal blade (SONET blade) carries an OC-n_SFP light transceiver 91 for accommodating optical signals from an exterior, an LS_LSI 92 for accommodating low-speed service signals, an XC_LSI 93 for performing signal cross-connect, an HS_LSI 94 for accommodating high-speed network signals, and a CPU 95 for attending to internal apparatus control.

A back plane 96 is an optical back plane which is comprised of optical waveguides and optical devices. Further provided on the small-size board 90 are a multi-wavelength VCSEL module 97 with a built-in optical sheet connector for inputting/outputting a plurality of optical signals, and a wavelength multiplexing/demultiplexing module 98 for the wavelength multiplexing of the optical signals supplied from the multi-wavelength VCSEL module 97 and for the wavelength demultiplexing of the multiplexed signals supplied from the back plane 96. Moreover, a sheet connector (CN) 99 is provided on the small-size board 90 for the purpose of communicating with a power supply and other blades.

According to the invention, the height of the blade enclosure is sufficient to allow the maximum number of 16 SONET blades to be mounted in the case of 3U size. The height of a 42U-size rack, for example, is sufficient to allow 224 SONET blades to be mounted. On the other hand, a shelf-type SONET apparatus of a 14U-size height can allow only three units to be mounted, and the number of attachable SONET units is only 30 (3×10) in total. Moreover, a lateral-arrangement apparatus of 1U size allows only 42 units to be mounted. In comparison, the present invention achieves super-high density that is different orders of magnitude.

Moreover, the back plane that is a main concern for size reduction is configured to provide a ring structure so as to reduce the number of signals connected between blades, to adopt a BLSR system time-proven for use in the SONET system, and to provide couplings through optical signals.

Moreover, the number of attached main-signal blades may be optimized in accordance with the number of channels that are required to be accommodated, thereby reducing a cost in an early period after installment. Further, a bypass blade may be used to partition a back plane, making it possible to flexibly configure the apparatus in the enclosure. With this provision, it is possible to expand the capacity of the system and to help to reduce the size of the system and to improve future expandability.

A main-signal blade may be provided with the function to partition a back-plane ring inside the blade, the function to provide a through connection inside the blade for a main signal exchanged with the back plane, and the function to amplify a main signal exchanged with the back plane. Moreover, a main-signal blade may be provided with the function to exchange a main signal with the back plane of another blade-type optical transmission apparatus as the main signal is exchanged with its own back plane.

It should be noted that the LS_LSI serves as an external optical signal interface unit, the XC_LSI as a cross-connect unit, and the HS_LSI as an internal optical signal interface unit.

Further, the present invention is not limited to these embodiments, but various variations and modifications may be made without departing from the scope of the present invention.

The present application is based on Japanese priority application No. 2004-027104 filed on Feb. 3, 2004, with the Japanese Patent Office, the entire contents of which are hereby incorporated by reference.

What is claimed is:

1. A blade-type optical transmission apparatus, comprising:
    a plurality of main-signal blades, each of which is provided with an external optical signal interface unit, a cross-connect unit, and an internal optical signal interface unit;
    a blade enclosure in which said plurality of main-signal blades are enclosed;
    a back plane which is situated inside said blade enclosure and provides a two-fiber ring connection for the internal optical signal interface unit between the main-signal blades, wherein the two-fiber ring connection has two fibers connecting between each two adjacent ones of the main-signal blades; and
    a bypass blade, which is attached to a portion of said blade enclosure that is configured to receive one of the main-signal blades, and partitions the ring connection provided by said back plane.

2. A blade-type optical transmission apparatus, comprising:
    a plurality of main-signal blades, each of which is provided with an external optical signal interface unit, a cross-connect unit, and an internal optical signal interface unit;
    a blade enclosure in which said plurality of main-signal blades are enclosed;
    a back plane which is situated inside said blade enclosure and provides a two-fiber ring connection for the internal optical signal interface unit between the main-signal blades, wherein the two-fiber ring connection has two fibers connecting between each two adjacent ones of the main-signal blades; and
    a through blade, which is attached to a portion of said blade enclosure that is configured to receive one of the main-signal blades, and allows a through passage of a main signal inside said through blade as the main signal is exchanged with said back plane.

3. A blade-type optical transmission apparatus, comprising:
    a plurality of main-signal blades, each of which is provided with an external optical signal interface unit, a cross-connect unit, and an internal optical signal interface unit;
    a blade enclosure in which said plurality of main-signal blades are enclosed;
    a back plane which is situated inside said blade enclosure and provides a two-fiber ring connection for the internal optical signal interface unit between the main-signal blades, wherein the two-fiber ring connection has two fibers connecting between each two adjacent ones of the main-signal blades; and a power blade, which is attached to a portion of said blade enclosure that is configured to receive one of the main-signal blades, and amplifies a main signal exchanged with said back plane.

4. A blade-type optical transmission apparatus, comprising:
   a plurality of main-signal blades, each of which is provided with an external optical signal interface unit, a cross-connect unit, and an internal optical signal interface unit;
   a blade enclosure in which said plurality of main-signal blades are enclosed;
   a back plane which is situated inside said blade enclosure and provides a two-fiber ring connection for the internal optical signal interface unit between the main-signal blades, wherein the two-fiber ring connection has two fibers connecting between each two adjacent ones of the main-signal blades; and
   a joint blade, which is attached to a portion of said blade enclosure that is configured to receive one of the main-signal blades, and exchanges a main signal, exchanged with said back plane, with a back plane of another blade-type optical transmission apparatus.

5. A blade-type optical transmission apparatus, comprising:
   a plurality of main-signal blades, each of which is provided with an external optical signal interface unit, a cross-connect unit, and an internal optical signal interface unit;
   a blade enclosure in which said plurality of main-signal blades are enclosed; and
   a back plane which is situated inside said blade enclosure and provides a two-fiber ring connection for the internal optical signal interface unit between the main-signal blades, wherein the two-fiber ring connection has two fibers connecting between each two adjacent ones of the main-signal blades;
   wherein one of the main-signal blades provides at least one of a function to partition the two-fiber ring connection inside said one of the main-signal blades, a function to allow a through passage of a main signal inside said one of the main-signal blades as the main signal is exchanged with said back plane, and a function to amplify a main signal exchanged with said back plane.

6. A blade-type optical transmission apparatus, comprising:
   a plurality of main-signal blades, each of which is provided with an external optical signal interface unit, a cross-connect unit, and an internal optical signal interface unit;
   a blade enclosure in which said plurality of main-signal blades are enclosed;
   a back plane which is situated inside said blade enclosure and provides a two-fiber ring connection for the internal optical signal interface unit between the main-signal blades, wherein the two-fiber ring connection has two fibers connecting between two adjacent main-signal blades; and
   a bypass blade, which is attached to a portion of said blade enclosure that is configured to receive one of the main-signal blades, and partitions the ring connection provided by said back plane.

7. A blade-type optical transmission apparatus, comprising:
   a plurality of main-signal blades, each of which is provided with an external optical signal interface unit, a cross-connect unit, and an internal optical signal interface unit;
   a blade enclosure in which said plurality of main-signal blades are enclosed;
   a back plane which is situated inside said blade enclosure and provides a two-fiber ring connection for the internal optical signal interface unit between the main-signal blades, wherein the two-fiber ring connection has two fibers connecting between two adjacent main-signal blades; and
   a through blade, which is attached to a portion of said blade enclosure that is configured to receive one of the main-signal blades, and allows a through passage of a main signal inside said through blade as the main signal is exchanged with said back plane.

* * * * *